Figure 1:
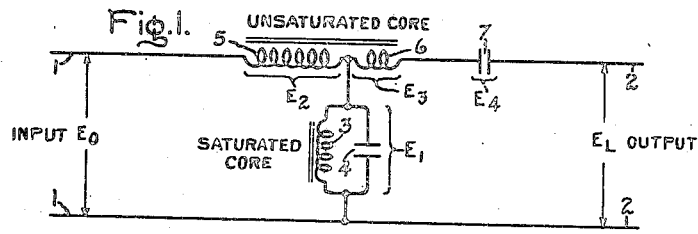

Inventors:
Joseph A. Uttal,
Thomas T. Short,
by Harry E. Dunham
Their Attorney.

Patented July 6, 1948

2,444,794

UNITED STATES PATENT OFFICE 2,444,794

VOLTAGE STABILIZING SYSTEM

Joseph A. Uttal and Thomas T. Short, Fort Wayne, Ind., assignors to General Electric Company, a corporation of New York Application February 13, 1945, Serial No. 577,685

2 Claims. (Cl. 323—61)

This invention relates to electric circuits and more particularly to improvements in automatic voltage stabilizer circuits.

A basic circuit which is common to many forms of static automatic voltage stabilizers consists of a so-called constant voltage device which is effectively connected across a load or output circuit whose voltage is to be maintained constant. Such a device has a volt-ampere characteristic which, over its operating range, is substantially parallel to the current axis and thus it has a substantially constant voltage over a relatively wide range of current. The "regulation" of the device, that is, the difference between its voltages at opposite ends of its operating range, is the measure of the constancy of the load voltage. Actually it is the variation in voltage drop in the supply circuit which is produced by the vector sum of the variable current of the load and the variable current of the constant voltage device which produces the regulating voltage of the stabilizer. The regulating voltage is thus the vector difference between the supply voltage, which is usually variable, and the load voltage, the load current also being usually variable.

The volt-ampere characteristic of the constant voltage device is usually defined as non-linear or non-ohmic because it is not a straight line passing through the origin of the voltage and current coordinates. The latter characterizes only a constant impedance.

A well-known form of constant voltage device is a saturated iron core inductance or reactor. Saturation causes very wide changes in magnetizing current with very small changes in voltage. By effectively connecting a capacitor in parallel with the reactor and having the volt-ampere characteristic of the capacitor intersect the magnetizing curve of the reactor above the knee of the latter the combination produces a non-ohmic capacitive reactance in the region between the knee of the magnetization curve and the intersection point of the two characteristics, which intersection point corresponds to resonance. Such a network has numerous advantages over a saturated inductance alone. Thus, the net current of the network is leading instead of lagging and also the net current is very much smaller than the magnetizing current so that the percentage change in current of the network with a given percentage change in voltage is very much greater in the case of the network than in the case of a simple saturated core reactor.

By reason of the leading current taken by the constant voltage network the regulating voltage is best obtained across a reactor as the leading current through the reactor tends to give a boost in voltage. However, other forms of series impedances may be used if desired.

The inherent regulation of this circuit, namely, the slope of the magnetization characteristic of the saturated reactor, may be effectively neutralized by various forms of compensating means for any particular load power factor. However, when the power factor varies, a given compensator will not produce proper compensation so that the stabilizer has an objectionable amount of regulation. This is one of the principal shortcomings of present voltage stabilizers and so far as applicant is aware there is no voltage stabilizer of this general type now on the market which provides satisfactory power factor compensation. In other words, changes in load power factor on all known prior art stabilizers cause an objectionable increase in regulation over the regulation obtained when the stabilizer is operated between zero and full load at the particular power factor for which it is adjusted.

One well-known way of correcting or compensating for a voltage droop with increasing values of zero power factor lagging load current is to cause this current to flow through a series capacitor. However, a capacitor has an ohmic impedance, and as the stabilizer includes a non-ohmic element, it is not obvious that a series capacitor will correct for the regulation of a compensated stabilizer with variations in load power factor. However, when a series capacitor is considered for this purpose its ohmic value should, it would seem on first thought, be equal to the ohmic value of the series reactor part of the stabilizer as it is the drop in the series reactor which in the last analysis causes the variation in output voltage of the stabilizer with variations in load power factor. However, I have found that a series capacitor having an effective ohmic value equal to the ohmic value of the series reactor will not produce compensation for load power factor changes in the compensated stabilizer of the above type but I have found that a series capacitor having a very much smaller effective ohmic value, namely, an effective ohmic value of the order of 12 per cent of the ohmic value of the series reactor, will produce substantially complete power factor compensation of an otherwise compensated voltage stabilizer. One explanation of this fact is that while it is the load current alone which flows through the series capacitor, it is the vector sum of the load current and the current of the constant voltage device which flows through the series reactor. Another aspect of this explanation is that while the currents through the series reactor and series capacitor are different in magnitude, they are also substantially different in phase so that the voltage drops in these devices are not directly out of phase as they would be if they carried the same current. By the "effective" ohmic value of the series capacitor is meant the ratio of the "drop" in volts in the load circuit produced by the series capacitor to the value of the load current in amperes. Thus, if the series capacitor is connected directly in the load circuit, it is the ratio of the voltage across it to the current through it, but in many cases it is preferable to insert a series transformer between the capacitor and the load circuit so that a capacitor having the same volt-ampere rating but of the most economical value of capacity in microfarads may be used. In the latter case the actual ohmic value of the capacitor will be substantially different but when it is viewed from the primary side of the series transformer, then the ratio of the current across the primary winding to the load current through it will be of the proper value.

An object of the invention is to provide substantially complete power factor correction of a voltage stabilizer which is compensated to hold substantially constant output voltage from zero to full load unity power factor and with substantial variations in input voltage.

Another object of the invention is to provide power factor compensation of a voltage stabilizer by means of a series capacitor whose effective reactance is a small fraction of the series inductive reactance of the stabilizer.

The invention will be better understood from the following description taken in connection with the accompanying drawing and its scope will be pointed out in the appended claims.

Figure 2:
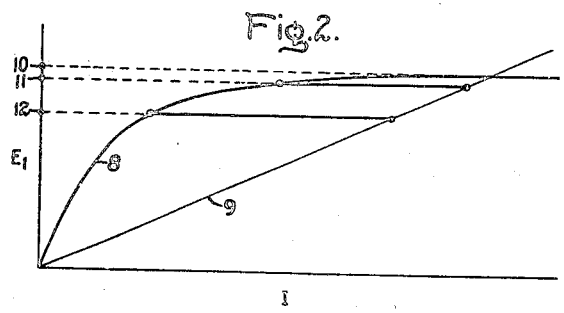
Figure 3:
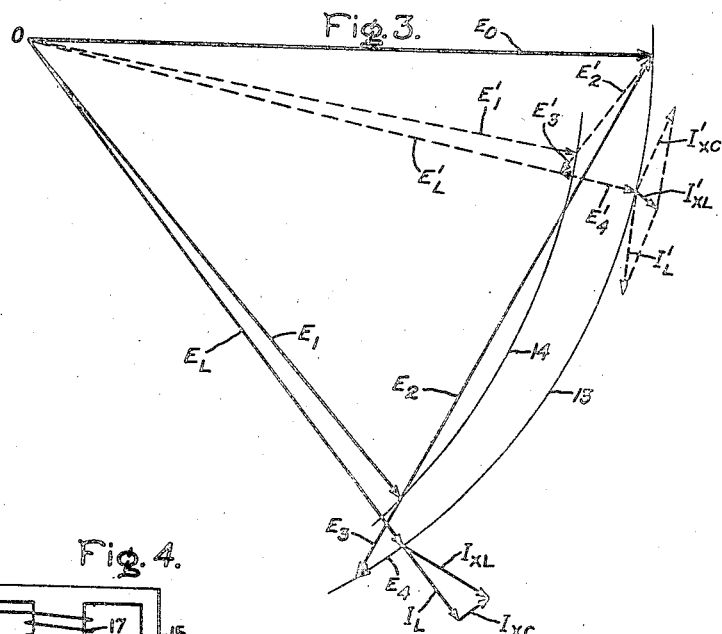
Figure 4:
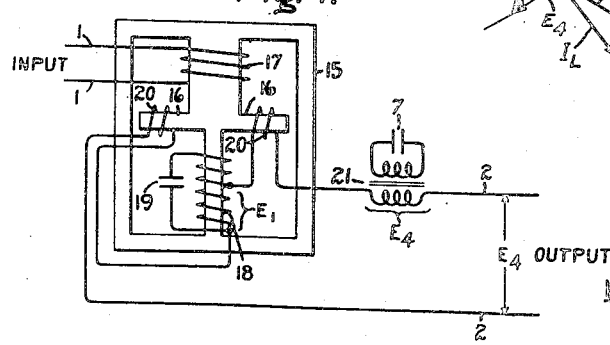

In the drawing, Fig. 1 illustrates diagrammatically an embodiment of the invention, Fig. 2 illustrates the volt-ampere characteristic of the constant voltage element of the stabilizer circuit shown in Fig. 1, Fig. 3 is a vector diagram for explaining the operation of the invention, and Fig. 4 illustrates a modification of the invention.

Referring now to the drawing, and more particularly to Fig. 1, the stabilizer is shown as comprising an input circuit 1 having a voltage $E_0$ and an output circuit 2 having an output or load voltage $E_L$. The constant voltage element or device of the stabilizer comprises a reactor 3 and a capacitor 4 connected in parallel with each other and effectively in shunt with the load circuit 2. The reactor 3 has a saturated iron core. It is not essential that the entire core be saturated but it is essential that a portion of it be saturated so as to give a sharp bend or knee to its magnetization curve and this is accomplished by any well-known manner, as providing the core with one or more restricted sections or one or more bridged air gaps. The voltage across the constant voltage network is designated as $E_1$. Serially connected in the input circuit is a reactor 5 having a normally unsaturated iron core so that the reactor 5 has linear volt-ampere characteristic over its operating range. This is best accomplished by inserting one or more air gaps in the core so as to prevent saturation. The voltage across the reactor 5 is $E_2$.

For compensating the stabilizer for its inherent regulation between zero and full-load unity power factor a relatively few reversely connected turns 6 on the core of the reactor 5 are connected in the output circuit 2. The voltage of these turns is designated as $E_3$. For compensating the stabilizer for the increased regulation caused by wattless components of load current a capacitor 7 is serially connected in the load circuit 2. The voltage across the capacitor is designated as $E_4$.

It will of course be understood that the winding of the reactor 3 can be used as either a voltage step-up or a voltage step-down autotransformer and therefore the winding 5 of the reactor and the turns 6 thereof can be connected to various intermediate points in this winding, if desired, so as to change the ratio of input to output voltage in an obvious manner. It will also be understood that it is not necessary to connect the capacitor 7 directly in series with the load circuit 2 and, if desired, a series transformer of suitable ratio can be interposed between the capacitor 7 and the circuit 2, as is shown in Fig. 4.

The operation of Fig. 1 can best be understood by reference to Figs. 2 and 3. Referring first to Fig. 2, this shows the volt-ampere characteristic 8 of the saturated reactor 3 and the volt-ampere characteristic 9 of the capacitor 4. The intersection of these two characteristics corresponds to resonance, at which point the currents in the two elements are equal and as these currents are diametrically out of phase the resultant current of the constant voltage device is zero. As the voltage $E_1$ across the two elements decreases, the current increases very rapidly and it will be observed that this is a leading current because at any value of voltage the capacitor current is greater than the reactor current. However, beyond resonance the net current reverses and becomes lagging. The volage $E_1$ designated by the point 10 corresponds to the resonance voltage, and the voltage designated by the point 11 corresponds to the voltage $E_1$ at approximately full-load unity power factor so that the voltage difference between the points 10 and 11 corresponds to the regulation of the constant voltage device between zero and full-load unity power factor. The point 12 represents the voltage of the constant voltage device at the same full-load value of load current but with this current lagging 90 degrees so that the added regulation or droop in voltage caused by a phase shift in load current from in-phase to 90 degrees lagging is represented by the difference between the voltages 11 and 12.

Referring now to Fig. 3, the horizontal vector $E_0$ is the base vector of this diagram and it will be assumed for purposes of illustration that it stays fixed in magnitude and phase, although, as will be explained later, the stabilizer also acts to maintain constant output voltage $E_L$ when $E_0$ varies in magnitude. Its magnitude is assumed to be 100% or normal in the diagram. The arc 13 is the arc of a circle whose center is the point 0 at the start of the vector $E_0$. This arc represents the locus of the constant output voltage $E_L$ and the radius of the arc is assumed to be equal to 100%, or rated, output voltage. The arc or curve 14 represents the "regulation" of the constant voltage device which accompanies load power factor changes at rated volt-ampere output, that is to say, its radial variation corresponds to the variation in voltage $E_1$ throughout the operating range of the stabilizer between points 11 and 12 in Fig. 2 (Figs. 2 and 3 are not to the same scale). It will be seen that as $E_1$ swings counterclockwise more and more into phase with $E_0$, the radius of arc 14 decreases, showing that the voltage $E_1$ progressively decreases. The full line vectors represent the voltage and currents of the circuit under full-load unity power factor conditions. The full-load unity power factor current is indicated by the vector $I_L$ which is shown in phase with $E_L$, the output voltage, and the current sector, $I_{XC}$ represents the leading capacitive current taken by the constant voltage device and which current vector is shown leading the voltage $E_1$ by substantially 90 degrees. The vector sum of these currents $I_{XL}$ is the current which flows through the reactor 5 and consequently it lags the voltage $E_2$ of the reactor 5 by 90 degrees. It will be seen that $E_1 + E_2 = E_0$ in Fig. 3 as well as in Fig. 1. The vector $E_3$ is 180 degrees out of phase with $E_2$ and it terminates substantially on the arc 13 so that the vector sum of $E_1$ and $E_3$ equals 100% output voltage. The vector $E_4$, being the voltage across the series capacitor 7, lags the load current $I_L$ by 90 degrees and as it is a voltage drop it is subtracted from $E_1$ and $E_3$ in order to give the final value of $E_L$. It will be observed that $E_4$ is substantially tangent to arc 13 so that it has no appreciable effect on $E_L$. As the load current at unity power factor decreases, the vector $E_1$ swings counterclockwise with slightly increasing value, thus decreasing the value of the leading current $I_{XC}$ taken by the constant voltage device, as is illustrated in Fig. 2, with the result that the voltage $E_2$ decreases and consequently also the voltage $E_3$ decreases, with the result that both ends of $E_4$ stay substantially on the arc 13.

If now the full-load value of load current is lagging $E_L$ by 90 degrees, the diagram will swing around so that conditions will be represented by the dashed-line vectors. Thus $E'_1$ is the new value and position of the voltage across the constant voltage device, and $I'_L$ is the full-load value of zero power factor lagging current. Due to the inevitable losses this current will not lag the voltage by quite 90 degrees. As shown by the materially shorter length of $E'_1$ than $E_1$, the voltage of the constant voltage device has dropped to a point in the neighborhood of the point 12 in Fig. 2 so that the leading current taken by this device increases very materially to the value $I'_{XC}$ and the resultant current through the reactor 5 becomes the loss current $I'_{XL}$ which lags the voltage $E'_2$ by 90 degrees. It will be seen that the head of the vector $E'_3$ does not reach the arc 13, showing that without the capacitor 7 there would be a material drop in output voltage. In fact, $E'_3$ actually tends to reduce the output voltage under these conditions. However $E'_4$ is practically in line with $E'_L$ so that the voltage drop in the capacitor 7 due to the lagging load current now produces an increase in output voltage which brings the final output voltage $E'_L$ up to the arc 13.

For intermediate values of lagging power factor at full-load the vector diagram will be intermediate the full-line and dashed-line diagrams shown in Fig. 3.

Considering only the lengths of the vectors, the ratio $E_2/I_{XL}$ is the same as $E'_2/I'_{XL}$ and equals the reactance of the reactor 5. Likewise, $E_4/I_L$ is the same as $E'_4/I'_L$ and equals the effective reactance of the capacitor 7. It is therefore clear that the effective reactance of the capacitor 7 is very much less than the reactance of the reactor 5. Typically it is about 12%. Furthermore, the maximum voltage-amperes of the capacitor 7 is still less than the maximum volt-amperes of the reactor (full-load unity power factor) because both the voltage and current of the capacitor are less than the voltage and current of the reactor. Consequently, in comparison with the size of the other elements of the stabilizer the capacitor is a very small element.

The vector $E_0$ in Fig. 3 may be considered as the average or nominal value of supply voltage. If this supply voltage increases or decreases there will be corresponding but very much smaller changes in voltage $E_1$ across the constant voltage device and this will cause it to change its wattless leading current in such a manner that the vector $E_2$ varies both in phase position and magnitude, with the result that $E_1$ also shifts its phase position, but when $E_3$ is added to $E_1$ and $E_4$ is subtracted the resulting output voltage $E_L$ lies substantially on the arc 13 so that the load voltage remains substantially constant for material variations in supply voltage. Changes in load magnitude also cause the various vectors to change in magnitude or position or both so as to keep $E_L$ constant. In the case of no load and maximum input voltage the constant voltage device may even invert, that is to say, its voltage may even rise slightly above the resonance point so that it draws a wattless lagging current which when flowing through the reactor 5 will cause a decrease in voltage and thus the stabilizer will actually act to hold the load voltage down below the supply voltage.

In the modification shown in Fig. 4 the stabilizer has only one core 15 instead of two separate cores as in Fig. 1. This core is shown by way of example as being of the shell type, the center or winding leg being provided with magnetic shunts 16. The winding leg has separate coil receiving sections, one being of larger cross section than the other. A primary winding 17 is wound on the larger section and a secondary winding 18 is wound on the smaller section and a capacitor 19 is tuned in the neighborhood of resonance with the secondary winding 18 when normal voltage is impressed across the primary winding. This causes a relatively high current to flow in the winding 18 which saturates the portion of the core on which it is wound. The leakage flux through the magnetic shunts 16 cause the transformer to have a high leakage reactance and it is this leakage reactance which corresponds with the reactance of the series reactor 5 of Fig. 1. Also, it is the secondary winding 18 and the capacitor 19 which correspond to the constant voltage device of Fig. 1. The load circuit 2 is connected across any suitable portion of winding 18 through a compensating winding 20 wound on the magnetic shunts so as to have a voltage induced in it which is proportional to the leakage reactance voltage of the transformer, with the result that compensating winding 20 corresponds to compensating winding 6 of Fig. 1. The series capacitor 7 is connected in the load circuit 2 by means of a series transformer 21. With this arrangement the volt-amperes of the capacitor 7 are practically the same as if this capacitor were connected directly in the load circuit as in Fig. 1, but its ratio of voltage to current can be made anything desired. However, when viewed from the primary terminals of the series capacitor 21, the effective capacitive reactance of the combination of elements 7 and 21 is such as to produce a voltage drop in the load circuit corresponding to the vector $E_4$ in Fig. 3.

Fig. 4 operates in generally the same manner as Fig. 1 and its operation is explained by Fig. 3 in which the various vectors are those of the corresponding quantities or elements in this figure.

It will be understood that my above-described power factor compensated stabilizer can also be compensated for frequency variations and harmonics in its output voltage can be filtered out in any suitable manner, if desired.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States is:

1. Voltage stabilizing apparatus having, in combination, a linear series effectively inductive reactance through which load current is drawn from a source, said apparatus having an effective non-ohmic shunt capacitive reactance whose current is also effectively drawn through said linear series inductive reactance, the volt-ampere curve of said shunt reactance being almost parallel to the current axis over its working range and having such a slope that its leading current varies inversely with its voltage, and a linear effectively series capacitive reactance through which said load current is drawn to the exclusion of the current of said effectively non-linear shunt capacitive reactance, the effective reactance of said series capacitive reactance being of the order of twelve per cent of the reactance of said series inductive reactance.

2. In combination, a transformer having an abnormally high leakage reactance, a capacitor coupled to the secondary winding of said transformer and tuned to near resonance therewith, a load circuit connected to said secondary winding, means for inserting a compensating voltage in said load circuit which is proportional to the leakage reactance drop in said transformer, and a capacitor effectively serially connected in said load circuit for compensating the output voltage of said transformer for variations in load power factor, the effective volt-amperes of said second capacitor being of the order of twelve per cent of the volt-amperes associated with the leakage reactance of said transformer under all normal conditions of operation of said transformer.

JOSEPH A. UTTAL,
THOMAS T. SHORT.

REFERENCES CITED

The following references are of record in the file of this patent:

UNITED STATES PATENTS

| Number | Name | Date |
|---|---|---|
| 2,179,353 | Schmutz et al. | Nov. 7, 1939 |